(12) United States Patent
Kashiwagi et al.

(10) Patent No.: US 10,732,633 B2
(45) Date of Patent: Aug. 4, 2020

(54) OPERATION MODEL CONSTRUCTION SYSTEM, OPERATION MODEL CONSTRUCTION METHOD, AND NON-TRANSITORY COMPUTER READABLE STORAGE MEDIUM

(71) Applicant: FUJI XEROX CO., LTD., Tokyo (JP)

(72) Inventors: Takaaki Kashiwagi, Kanagawa (JP); Masayasu Takano, Kanagawa (JP); Kazutoshi Yatsuda, Kanagawa (JP); Kaoru Yasukawa, Kanagawa (JP); Ryosuke Nakanishi, Kanagawa (JP); Daigo Kusano, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/411,774

(22) Filed: May 14, 2019

(65) Prior Publication Data

US 2019/0265706 A1 Aug. 29, 2019

Related U.S. Application Data

(63) Continuation of application No. 15/340,312, filed on Nov. 1, 2016, now Pat. No. 10,331,130.

(30) Foreign Application Priority Data

May 13, 2016 (JP) ................................ 2016-096674

(51) Int. Cl.
*G05D 1/00* (2006.01)
*G06F 16/29* (2019.01)
(Continued)

(52) U.S. Cl.
CPC ......... *G05D 1/0088* (2013.01); *G05D 1/0221* (2013.01); *G06F 16/285* (2019.01);
(Continued)

(58) Field of Classification Search
CPC .............. G05D 1/0088; G05D 1/0221; G05D 2201/02; G06N 20/10; G06N 5/003;
(Continued)

(56) References Cited

U.S. PATENT DOCUMENTS 9,523,984 B1 * 12/2016 Herbach ............... B62D 15/025
10,185,998 B1 * 1/2019 Konrardy ............... G06Q 40/08
(Continued)

FOREIGN PATENT DOCUMENTS

| JP | 2005-184867 A | 7/2005 |
|---|---|---|
| JP | 2007-008203 A | 1/2007 |

OTHER PUBLICATIONS

Mar. 17, 2020 Office Action issued in Japanese Patent Application No. 2016-096674.

*Primary Examiner* — Muhammad Shafi
(74) *Attorney, Agent, or Firm* — Oliff PLC

(57) ABSTRACT

An automatic moving object obtains, from a sensor, operating data and external environment data of the automatic moving object, constructs a plurality of operation models based on the operating data and the external environment data, and controls automatic movement of the automatic moving object based on the constructed plurality of operation models. An automatic moving object transmits the constructed plurality of operation models to another automatic moving object. An automatic moving object receives a plurality of operation models from another automatic moving object, and controls automatic movement based on the received plurality of operation models.

13 Claims, 12 Drawing Sheets

(51) Int. Cl.
*G06F 16/28* (2019.01)
*G05D 1/02* (2020.01)
*G06N 5/00* (2006.01)
*G06N 20/10* (2019.01)
*G06N 20/00* (2019.01)

(52) U.S. Cl.
CPC ............. *G06F 16/29* (2019.01); *G06N 5/003* (2013.01); *G06N 20/10* (2019.01); *G05D 2201/02* (2013.01); *G06N 20/00* (2019.01)

(58) Field of Classification Search
CPC ....... G06N 20/00; G06F 16/285; G06F 16/29; B60T 2210/30; B60T 8/172
USPC .......................................................... 701/27
See application file for complete search history.

(56) References Cited

U.S. PATENT DOCUMENTS

| | | |
|---|---|---|
| 2006/0217993 A1 | 9/2006 | Anderson |
| 2009/0171528 A1 | 7/2009 | Golde et al. |
| 2010/0256852 A1* | 10/2010 | Mudalige ............... G08G 1/163 701/24 |
| 2013/0085642 A1 | 4/2013 | Dankers |
| 2013/0332402 A1* | 12/2013 | Rakshit .................... G06N 5/02 706/46 |
| 2017/0057542 A1* | 3/2017 | Kim ..................... B62D 15/025 |

* cited by examiner

FIG.7

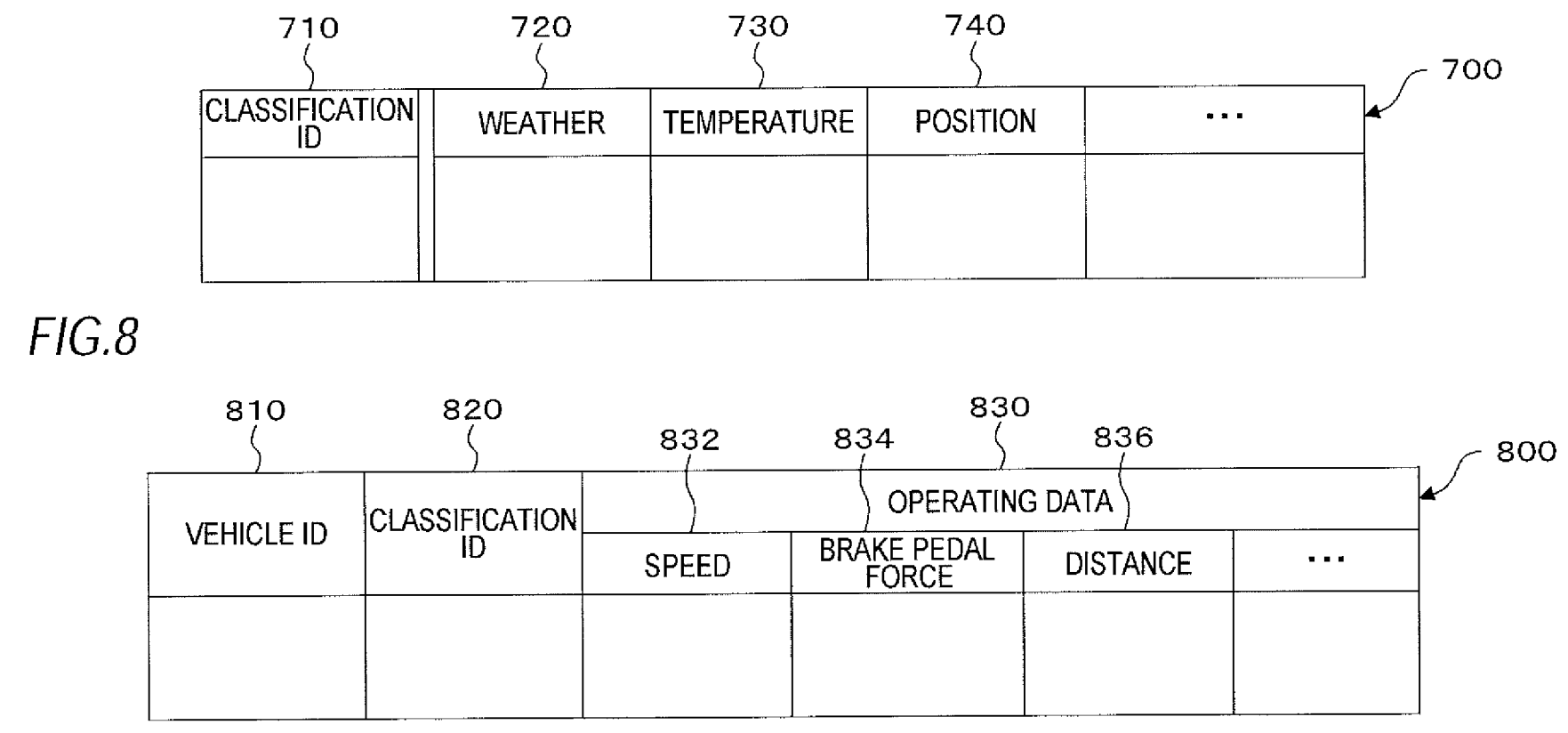

| CLASSIFICATION ID | WEATHER | TEMPERATURE | POSITION | ... |
|---|---|---|---|---|
| 710 | 720 | 730 | 740 | |

| VEHICLE ID | CLASSIFICATION ID | OPERATING DATA | | | |
|---|---|---|---|---|---|
| | | SPEED | BRAKE PEDAL FORCE | DISTANCE | ... |
| 810 | 820 | 832 | 834 | 836 | |

Figures 9, 10:
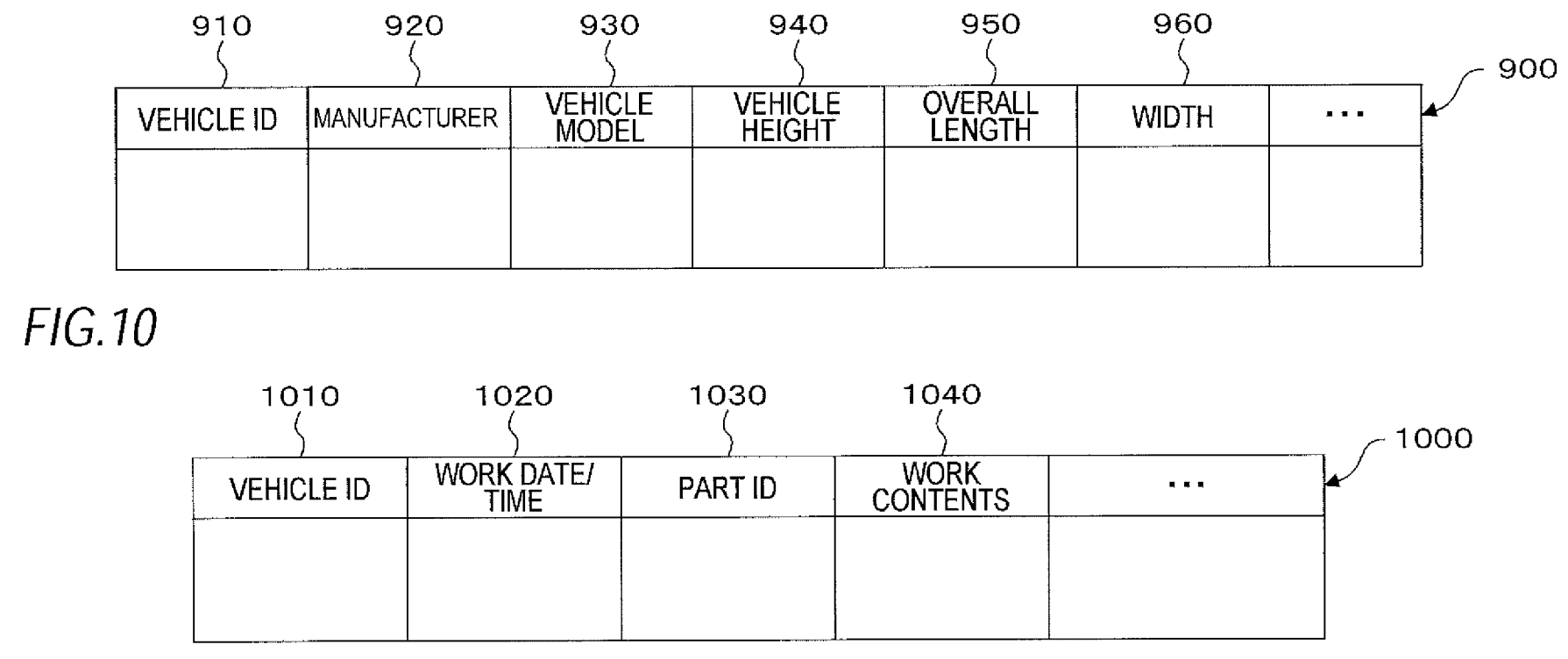

| VEHICLE ID | MANUFACTURER | VEHICLE MODEL | VEHICLE HEIGHT | OVERALL LENGTH | WIDTH | ... |
|---|---|---|---|---|---|---|
| | | | | | | |

| VEHICLE ID | WORK DATE/ TIME | PART ID | WORK CONTENTS | ... |
|---|---|---|---|---|
| | | | | |

| 1310 | 1320 TIME-SERIES WEATHER | | | 1330 TIME-SERIES TEMPERATURE | | | 1340 TIME-SERIES POSITION | | |
|---|---|---|---|---|---|---|---|---|---|
| CLASSIFICA-TION ID | 1322 CURRENT | 1324 12 HOURS AGO | 1326 24 HOURS AGO | 1332 CURRENT | 1334 3 HOURS AGO | 1336 6 HOURS AGO | 1342 CURRENT | 1344 1 HOUR AGO | 1346 2 HOURS AGO |
| | | | | | | | | | ... |

1300

OPERATION MODEL CONSTRUCTION SYSTEM, OPERATION MODEL CONSTRUCTION METHOD, AND NON-TRANSITORY COMPUTER READABLE STORAGE MEDIUM

CROSS-REFERENCE TO RELATED APPLICATIONS

This is a continuation application of U.S. patent application Ser. No. 15/340,312, filed on Nov. 1, 2016, which claims priority under 35 USC § 119 from Japanese Patent Application No. 2016-096674, filed on May 13, 2016, the entire contents of which are hereby incorporated by reference.

BACKGROUND

Technical Field

The present invention relates to an operation model construction system, an operation model construction method, and a non-transitory computer readable storage medium.

SUMMARY

According to an aspect of the invention, an operation model construction system includes a data acquisition unit that acquires operating data and external environment data of a moving object, an associated data accumulation unit that accumulates associated data obtained by classifying the external environment data into plural items and associating the operating data with the respective items, and an operation model construction unit that constructs plural operation models to operate the moving object, based on the associated data.

BRIEF DESCRIPTION OF THE DRAWINGS

Exemplary embodiments of the present invention will be described in detail based on the following figures, wherein:

FIG. 7 is a view for explaining an exemplary data structure of a classification table;

FIG. 8 is a view for explaining an exemplary data structure of an associated data table;

FIG. 9 is a view for explaining an exemplary data structure of a vehicle body data table;

FIG. 10 is a view for explaining an exemplary data structure of a maintenance data table;

FIG. 13 is a view for explaining an exemplary data structure of a time-series classification table.

DETAILED DESCRIPTION

Hereinafter, exemplary embodiments of the present invention will be described with reference to the accompanying drawings.

Figure 1:
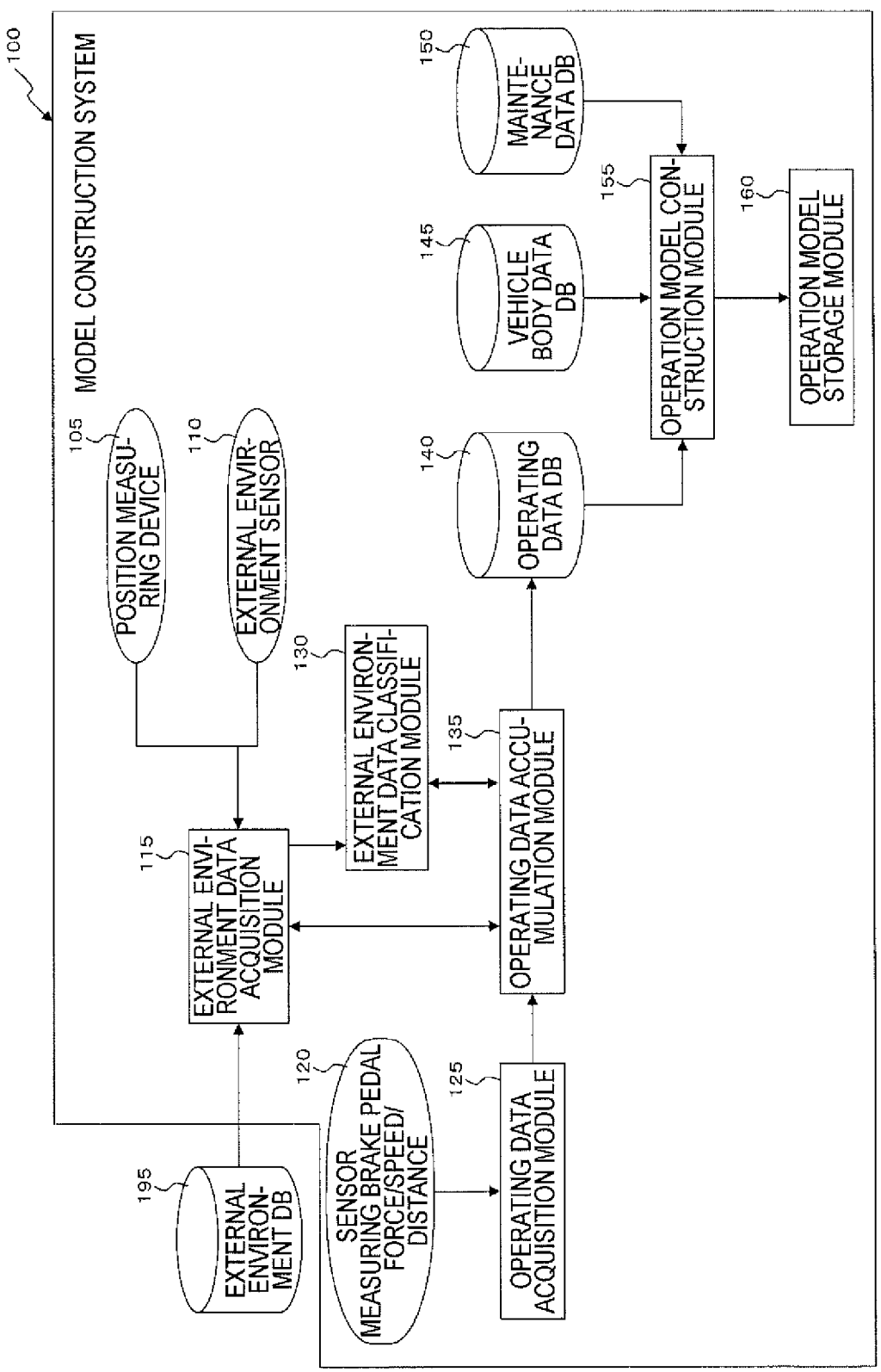
FIG. 1 is a conceptual module configuration view of an exemplary configuration of an exemplary embodiment.

FIG. 1 illustrates a conceptual module configuration view of an exemplary configuration of an exemplary embodiment.

Meanwhile, a module, in general, indicates a logically separable component such as software (a computer program) or hardware. Accordingly, a module in the present exemplary embodiment indicates not only a module in a computer program but also a module in a hardware configuration. Hence, descriptions of the present exemplary embodiments also include descriptions of a computer program to function as the module (a program to cause a computer to execute each process, a program to cause a computer to function as each unit, and a program to cause a computer to implement each function), a system, and a method. Here, for convenience of descriptions, the expressions "store," "cause to store," and equivalent expressions thereto will be used, and when an exemplary embodiment is a computer program, the expressions indicate causing data or the like to be stored in a storage device or performing a control to store data or the like in a storage device. In addition, one module may correspond to one function. In implementation, however, one module may be configured as one program, plural modules may be configured as one program, and in reverse, one module may be configured as plural programs. In addition, plural modules may be executed by one computer, or one module may be executed by plural computers in a distributed or parallel environment. In addition, one module may include another module. In addition, hereinafter, the term "connection" is also used in a case of a logical connection (e.g., data exchange, instructions, and a reference relationship among data), in addition to a physical connection. The term "predetermined" refers to being determined prior to a target processing, and includes the meaning of being determined according to a circumstance/state at or until a specific time point before a processing by the present exemplary embodiment is started, or prior to a target processing even after a processing by the present exemplary embodiment is started. When plural "predetermined values" exist, the values may be different from each other, or two or more of the values (including any values, of course) may be identical to each other. A description indicating that "when it is A, B is performed" is used to indicate that "whether it is A is determined, and when it is determined that it is A, B is performed," except for a case where the determination of whether it is A is unnecessary.

In addition, a system or a device includes a case where the system or the device is implemented by, for example, one computer, hardware component, and device, in addition to a case where plural computers, hardware components, devices and others are configured to be connected to each other by a communication unit such as a network (including one-to-one corresponding communication connection). The terms "device" and "system" are used to have the same meaning. Of course, the "system" does not include a mere system indicating a social "structure" (social system) which is an artificial engagement.

In addition, target information is read from a storage device per processing by each module or for each of plural processings which is executed in a module. After the processing is executed, the processing result is recorded in the storage device. Accordingly, descriptions of the reading from the storage device prior to the processing and the recording in the storage device after the processing may be omitted. In addition, the storage device may include, for example, a hard disk, a random access memory (RAM), an external storage medium, a storage device through a communication line, and a register within a central processing unit (CPU).

A model construction system 100 according to the present exemplary embodiment constructs operation models for use in operation of a moving object (which may include an automatic operation). As illustrated in the example of FIG. 1, the model construction system 100 includes a position measuring device 105, an external environment sensor 110, an external environment data acquisition module 115, a sensor 120 measuring a brake pedal force/speed/distance, an operating data acquisition module 125, an external environment data classification module 130, an operating data accumulation module 135, an operating data DB 140, a vehicle body data DB 145, a maintenance data DB 150, an operation model construction module 155, and an operation model storage module 160.

Here, the "moving object" may be a vehicle used for a movement of a human being or an object and includes, for example, an automobile, a two-wheeled vehicle, a trolley, ship, a plane, a helicopter, a drone, and a wheel chair. The moving object is equipped therein with the model construction system 100 generating operation models. Hereinafter, an automobile (an automatic driving vehicle 410) will be described as an example of the vehicle. The automobile includes, for example, an automatic driving car and an automobile called, for example, a connected car.

The automatic driving car may operate the vehicle itself according to operation models for an operation of the vehicle, in addition to a function to collect operating data of the vehicle. Specifically, vehicle control data (specifically, a traveling direction, a vehicle speed, a steering angle and others) for automatic driving of the vehicle are generated by applying the operating data collected by the vehicle to the operation models. The operation of the automatic driving car is controlled by the generated vehicle control data.

In order to improve the safety of an automobile (without being limited to the connected car or the automatic driving car), a driving support system such as an autonomous emergency brake or an active cruise control (ACC), or a cooperative driving support system implemented by a vehicle-to-vehicle (V2V) communication such as a cooperative active cruise control (CACC) has been developed. The present exemplary embodiment may be used for these technologies.

The position measuring device 105 is connected to the external environment data acquisition module 115. The position measuring device 105 acquires position data (e.g., the latitude and the longitude) of the automatic driving vehicle 410. For example, a global positioning system (GPS), a beacon, or an electronic toll collection (ETC) system may be used.

The external environment sensor 110 is connected to the external environment data acquisition module 115. The external environment sensor 110 acquires data for an external environment of the automatic driving vehicle 410. For example, a thermometer, a hygrometer, a barometer, a rain gauge, an anemometer, or a distance meter may be used. The distance meter measures, for example, a distance between the automatic driving vehicle 410 and an obstacle (an object with which the vehicle may collide) or the like.

An external environment DB 195 is connected to the external environment data acquisition module 115 of the model construction system 100 through a communication line (in general, a wireless line). The external environment DB 195 receives, for example, position data from the external environment data acquisition module 115 and transmits meteorological information (weather and climate) of the position to the external environment data acquisition module 115. The meteorological information may include past meteorological information and anticipated future meteorological information, in addition to current meteorological information. Further to the meteorological information itself, the meteorological information may include advisory/warning, information of a snow accumulation amount and earthquake intensity/sea waves, and others. In addition, the external environment DB 195 receives the position data from the external environment data acquisition module 115 and transmits road and traffic information of the position to the external environment data acquisition module 115. The road and traffic information may include, for example, traffic congestion information, traffic regulation information, road guide, and parking lot information.

The external environment data acquisition module 115 is connected to the position measuring device 105, the external environment sensor 110, the external environment data classification module 130, the operating data accumulation module 135, and the external environment DB 195. The external environment data acquisition module 115 acquires external environment data of the automatic driving vehicle 410 from the position measuring device 105, the external environment sensor 110, and the external environment DB 195, and sends the environment data to the external environment data classification module 130 and the operating data accumulation module 135. Especially, the external environment data acquisition module 115 may acquire past external environment data. For example, the external environment data acquisition module 115 may acquire past meteorological information from the external environment DB 195. In addition, the external environment data acquisition module 115 may acquire past external environment data in different time periods, depending on types of external environment data. For example, past every-12-hour data may be acquired for meteorological information, and past data per 3 hours may be acquired for a temperature. These data may be acquired from the external environment DB 195. In addition, for example, past every-hour data may be acquired for a position. To this end, the history information of the position measuring device 105 may be stored, and the data may be extracted therefrom.

In addition, the external environment data acquisition module 115 may acquire anticipated future external environment data depending on types of external environment data. For example, the meteorological information may include meteorological information after 12 hours. In addition, the external environment data acquisition module 115 may acquire future external environment data in different time periods, depending on types of external environment data, like the above-described past external environment data. For example, future every-12-hour data may be acquired for meteorological information, and future data per 3 hours may be acquired for a temperature. These data may be acquired from the external environment DB 195. In addition, for example, future every-hour data may be acquired for a position. These data may be calculated from a current speed, direction and others.

The sensor 120 measuring a brake pedal force/speed/distance is connected to the operating data acquisition module 125. The sensor 120 measuring a brake pedal force/speed/distance acquires operating data of the automatic driving vehicle 410. For example, a sensor measuring a brake pedal force, a speed, a traveling distance, the number of engine revolutions, a gear position, an accelerator opening angle, a steering angle, a traveling direction and others may be used. In addition, operating data such as front and rear inclination angles and left and right inclination angles may be acquired.

The operating data acquisition module 125 is connected to the sensor 120 measuring a brake pedal force/speed/distance and the operating data accumulation module 135. The operating data acquisition module 125 acquires operating data representing a driving status of the automatic driving vehicle 410 from the sensor 120 measuring a brake pedal force/speed/distance. For example, when a brake pedal is stepped on during traveling at a specific position, operating data such as a speed prior to the brake pedal stepping, a speed at the brake releasing time, a brake pedal force, and a braking distance are collected. That is, control data of a brake and a result data thereof (in which distance and to which extent the speed could be reduced) are collected as operating data.

The external environment data classification module 130 is connected to the external environment data acquisition module 115 and the operating data accumulation module 135. The external environment data classification module 130 acquires the external environment data from the external environment data acquisition module 115 and the operating data accumulation module 135, and classifies the external environment data into plural items. The classification may be performed according to predetermined conditions (conditions belonging to classification items) or using a clustering method. Here, the reason for classifying the external environment data is that it is favorable for the control to assume that when external environments are different from each other, operation models determining operation amounts are also different from each other. For example, the classification is performed as in a classification table 700 according to classification conditions. FIG. 7 is a view for explaining an exemplary data structure of the classification table 700. The classification table 700 includes a classification ID column 710, a weather column 720, a temperature column 730, a position column 740 and others. In the present exemplary embodiment, the classification ID column 710 stores information for uniquely identifying classification (classification ID (identification) and classification item). The weather column 720 stores weather (meteorological) data to be classified into the classification ID. The temperature column 730 stores temperature data to be classified into the classification ID. The position column 740 stores position data to be classified into the classification ID. That is, when external environment data correspond to data within the weather column 720, the temperature column 730, the position column 740 and others, the external environment data are classified into the classification ID of the classification ID column 710 which corresponds to the line of the external environment data. In addition, with respect to the description "external environment data correspond to data within the weather column 720 and others," the data within the weather column 720 and others and the external environment data may be in a relation of being exactly consistent with each other, or a difference therebetween may be less than or equal to or lower than a predetermined threshold value. When the data within the weather column 720 and others have a range, the external environment data may be in a relation of being included in the range. In addition, as the external environment data classification module 130, an identifier such as a support vector machine may be used.

The operating data accumulation module 135 is connected to the external environment data acquisition module 115, the operating data acquisition module 125, the external environment data classification module 130, and the operating data DB 140. The operating data accumulation module 135 acquires the operating data and the external environment data of the automatic driving vehicle 410 from the operating data acquisition module 125 and the external environment data acquisition module 115. The operating data accumulation module 135 accumulates associated data which are obtained by associating the operating data with the plural items classified by the external environment data classification module 130, in the operating data DB 140. Specifically, an operating data group is associated with classification items (classification ID) of an external environment at the time point of acquisition of the operating data group, and the associated data are stored in the operating data DB 140. Meanwhile, here, the "time point" includes, in addition to a case where the time point of the acquisition of the external environment data and the time point of the acquisition of the operating data are exactly identical to each other, a case where the time points are less than or within a predetermined time.

Since the operating data are accumulated while being associated with the classification items by the operating data accumulation module 135, the operating data are collected for the respective classification items according to the conditions of the external environment data so that similar operating data may be acquired under specific environments.

The operating data DB 140 is connected to the operating data accumulation module 135 and the operation model construction module 155. The operating data DB 140 stores the associated data that have been generated by the operating data accumulation module 135. For example, an associated data table 800 is stored in the operating data DB 140. FIG. 8 is a view for explaining an exemplary data structure of the associated data table 800. The associated data table 800 includes a vehicle ID column 810, a classification ID column 820, and an operating data column 830. The operating data column 830 includes a speed column 832, a brake pedal force column 834, a distance column 836 and others. In the present exemplary embodiment, the vehicle ID column 810 stores information (vehicle ID) for uniquely identifying a vehicle. The classification ID column 820 stores classification ID (corresponding to the classification ID column 710 of the classification table 700). The operating data column 830 stores operating data at a time point of the classification into the classification ID. The speed column 832 stores a speed. The brake pedal force column 834 stores a brake pedal force. The distance column 836 stores a distance.

The vehicle body data DB 145 is connected to the operation model construction module 155. The vehicle body data DB 145 stores data for the automatic driving vehicle 410 including the model construction system 100. For example, the vehicle body data DB 145 stores a vehicle body data table 900. FIG. 9 is a view for explaining an exemplary data structure of the vehicle body data table 900. The vehicle body data table 900 includes a vehicle ID column 910, a manufacturer column 920, a vehicle model column 930, a vehicle height column 940, an overall length column 950, a width column 960 and others. The vehicle ID column 910 stores vehicle ID. The manufacturer column 920 stores a manufacturer of the vehicle. The vehicle model column 930 stores a model of the vehicle. The vehicle height column 940 stores a height of the vehicle. The overall length column 950 stores an entire length of the vehicle. The width column 960 stores a width of the vehicle. Since these data do not need to be changed, they are preset. For example, the data are set to, for example, data at the manufacturing time of the automatic driving vehicle 410. Additionally, a driving system, brake parts, rotor parts, tires and so on may be stored.

The maintenance data DB 150 is connected to the operation model construction module 155. The maintenance data DB 150 stores data for the maintenance of the automatic driving vehicle 410 including the model construction system 100. The maintenance data include, for example, data representing when a work is performed for each part and what work is performed. For example, a maintenance data table 1000 is stored. FIG. 10 is a view for explaining an exemplary data structure of the maintenance data table 1000. The maintenance data table 1000 includes a vehicle ID column 1010, a work date and time column 1020, a part ID column 1030, a work content column 1040 and others. The vehicle ID column 1010 stores vehicle ID. The work date and time column 1020 stores date and time (year, month, day, hour, minute, second, a fraction of a second, or combinations thereof) of a work such as a vehicle repair. In the present exemplary embodiment, the part ID column 1030 stores information (part ID) for uniquely identifying each part within a vehicle. The work content column 1040 stores work contents of the part. These data are added when a work such as a repair (including a vehicle examination) of the automatic driving vehicle 410 is performed.

The operation model construction module 155 is connected to the operating data DB 140, the vehicle body data DB 145, the maintenance data DB 150, and the operation model storage module 160. The operation model construction module 155 constructs plural operation models to operate the automatic driving vehicle 410, based on the associated data within the operating data DB 140. In addition, the operation model construction module 155 may construct the plural operation models to operate the automatic driving vehicle 410, by adding the data within the vehicle body data DB 145 and the maintenance data DB 150.

For example, an operation model to calculate a brake pedal force is constructed as follows:

$$ax+by + \ldots +cz = \text{brake pedal force} \qquad \text{(Equation 1)}$$

Here, a, b, c and others are coefficients. x, y, z and others are operating data and include, for example, a speed at the braking start time and a braking distance. This function may be calculated by multiple regression analysis using the operating data as descriptive variables and the brake pedal force as a target variable. In addition, the function is constructed for each classification ID.

As the constructing method of the operation models, for example, machine learning may be used as well, in addition to the multiple regression analysis which is a kind of a multivariate analysis technique.

The operation model storage module 160 is connected to the operation model construction module 155. The operation model storage module 160 stores the operation models constructed by the operation model construction module 155.

Figure 2:
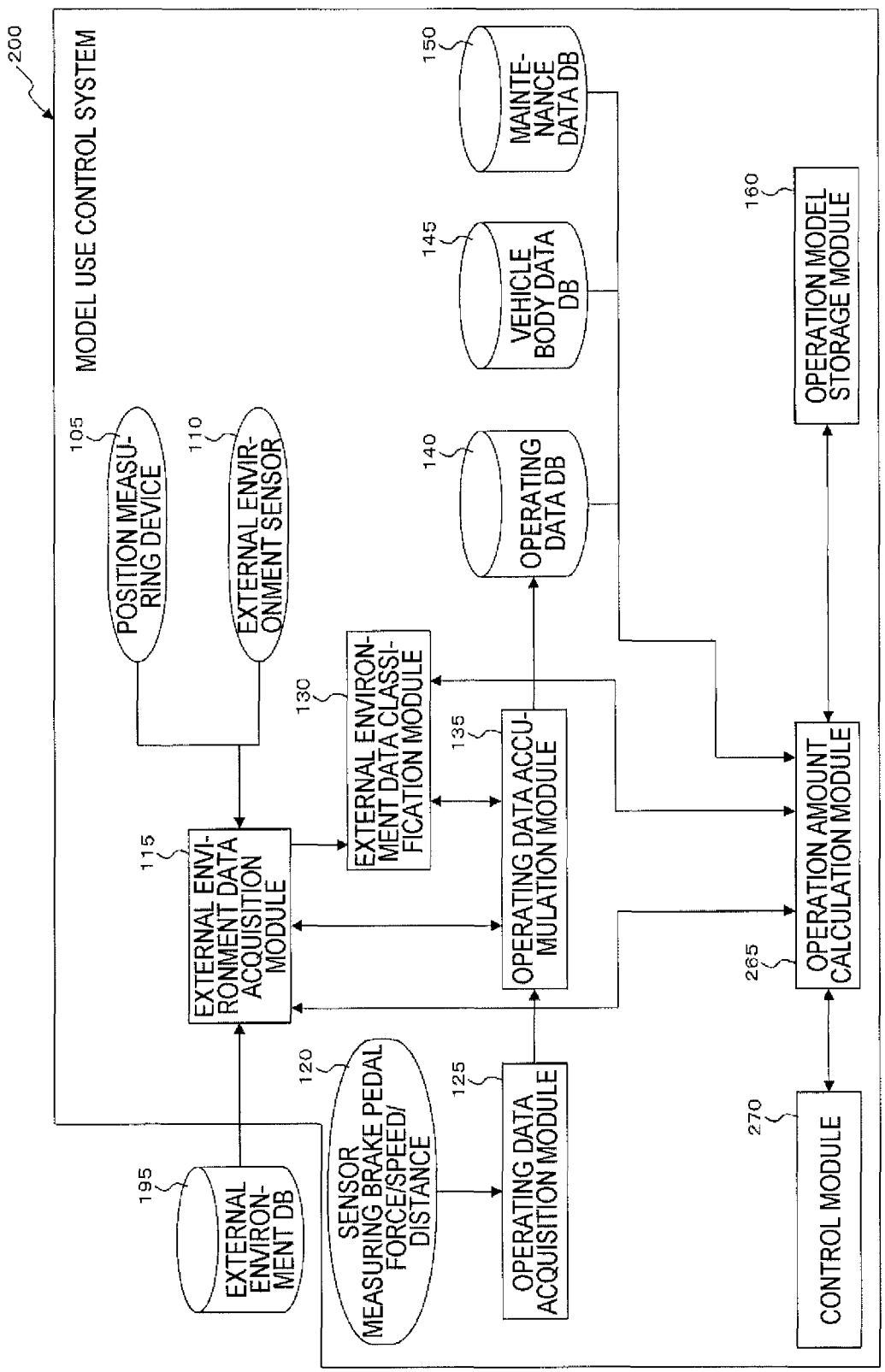
FIG. 2 is a conceptual module configuration view of an exemplary configuration of the exemplary embodiment.

FIG. 2 is a conceptual module configuration view of the exemplary configuration of the present exemplary embodiment.

While the model construction system 100 illustrated in the example of FIG. 1 constructs operation models, a model use control system 200 illustrated in the example of FIG. 2 controls the automatic driving vehicle 410 by using the operation models constructed in the model construction system 100. In addition, the same components as those of the model construction system 100 illustrated in the example of FIG. 1 will be denoted by the same reference numerals as used in FIG. 1, and thus, overlapping descriptions thereof will be omitted.

The model use control system 200 includes a position measuring device 105, an external environment sensor 110, an external environment data acquisition module 115, a sensor 120 measuring a brake pedal force/speed/distance, an operating data acquisition module 125, an external environment data classification module 130, an operating data accumulation module 135, an operating data DB 140, a vehicle body data DB 145, a maintenance data DB 150, an operation model storage module 160, an operation amount calculation module 265, and a control module 270.

The position measuring device 105 is connected to the external environment data acquisition module 115.

The external environment sensor 110 is connected to the external environment data acquisition module 115.

The external environment DB 195 is connected to the external environment data acquisition module 115 of the model use control system 200.

The external environment data acquisition module 115 is connected to the position measuring device 105, the external environment sensor 110, the external environment data classification module 130, the operating data accumulation module 135, the operation amount calculation module 265, and the external environment DB 195.

The sensor 120 measuring a brake pedal force/speed/distance is connected to the operating data acquisition module 125.

The operating data acquisition module 125 is connected to the sensor 120 measuring a brake pedal force/speed/distance and the operating data accumulation module 135.

The external environment data classification module 130 is connected to the external environment data acquisition module 115, the operating data accumulation module 135, and the operation amount calculation module 265.

The operating data accumulation module 135 is connected to the external environment data acquisition module 115, the operating data acquisition module 125, the external environment data classification module 130, and the operating data DB 140.

The operating data DB 140 is connected to the operating data accumulation module 135 and the operation amount calculation module 265.

The vehicle body data DB 145 is connected to the operation amount calculation module 265.

The maintenance data DB 150 is connected to the operation amount calculation module 265.

The operation model storage module 160 is connected to the operation amount calculation module 265.

The operation amount calculation module 265 is connected to the external environment data acquisition module 115, the external environment data classification module 130, the operating data DB 140, the vehicle body data DB 145, the maintenance data DB 150, the operation model storage module 160, and the control module 270. The operation amount calculation module 265 calculates an operation amount for traveling of the automatic driving vehicle 410, by extracting an applicable operation model from the operation model storage module 160 according to the classification result of the external environment data classification module 130, and applying the environment data (operating data necessary for the operation model) from the operating data DB 140 to the operation model. For example, the operation amount is calculated according to a current speed of the automatic driving vehicle 410, a speed at a target position after speed adjustment, and a distance to the target position.

Specifically, the brake pedal force is calculated as an operation amount by using Equation 1 above. In addition, the brake pedal force is calculated by applying the vehicle body data, the vehicle body maintenance data, and the operating data (e.g., the current speed and a distance to an obstacle) to the operation model of the brake pedal force.

The control module 270 is connected to the operation amount calculation module 265. The control module 270 controls each part (system) within the automatic driving vehicle 410 according to the operation amount calculated by the operation amount calculation module 265. For example, the brake of the automatic driving vehicle 410 is controlled according to the operation amount of the brake pedal force.

Figure 3:
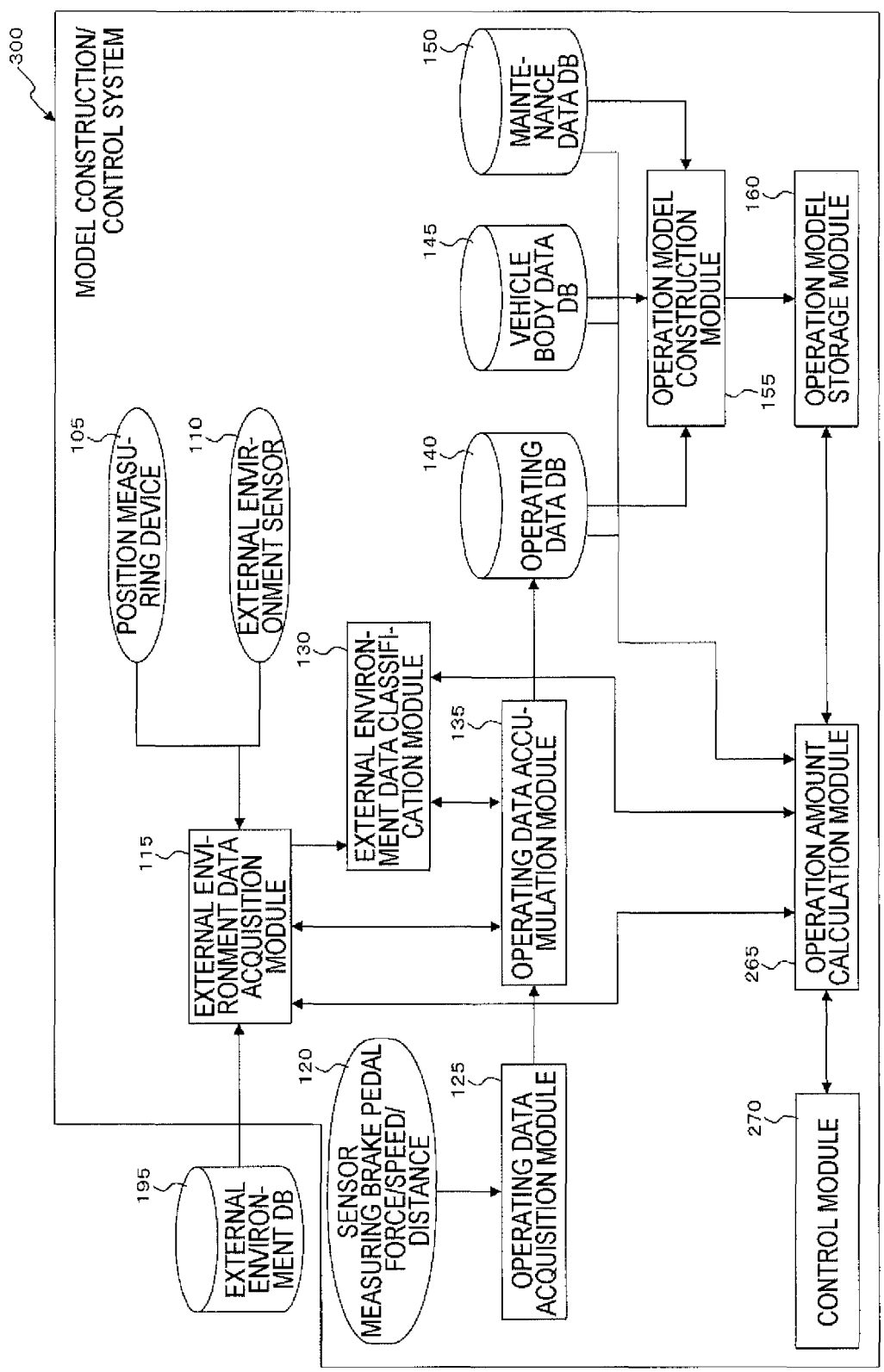
FIG. 3 is a conceptual module configuration view of an exemplary configuration of the exemplary embodiment.

FIG. 3 is a conceptual module configuration view of the exemplary configuration of the present exemplary embodiment.

While the model construction system 100 illustrated in the example of FIG. 1 constructs operation models, and the model use control system 200 illustrated in the example of FIG. 2 controls the automatic driving vehicle 410 by using the operation models constructed by the model construction system 100, a model construction/control system 300 illustrated in the example of FIG. 3 is a combination of the model construction system 100 and the model use control system 200. The model construction/control system 300 constructs operation models and controls the automatic driving vehicle 410 by using the constructed operation models. In addition, the same components as those of the model construction system 100 illustrated in the example of FIG. 1 and the model use control system 200 illustrated in the example of FIG. 2 will be denoted by the same reference numerals as used in FIGS. 1 and 2, and thus, overlapping descriptions thereof will be omitted.

The model construction/control system 300 includes a position measuring device 105, an external environment sensor 110, an external environment data acquisition module 115, a sensor 120 measuring a brake pedal force/speed/distance, an operating data acquisition module 125, an external environment data classification module 130, an operating data accumulation module 135, an operating data DB 140, a vehicle body data DB 145, a maintenance data DB 150, an operation model construction module 155, an operation model storage module 160, an operation amount calculation module 265, and a control module 270.

The position measuring device 105 is connected to the external environment data acquisition module 115.

The external environment sensor 110 is connected to the external environment data acquisition module 115.

The external environment DB 195 is connected to the external environment data acquisition module 115 of the model construction/control system 300.

The external environment data acquisition module 115 is connected to the position measuring device 105, the external environment sensor 110, the external environment data classification module 130, the operating data accumulation module 135, the operation amount calculation module 265, and the external environment DB 195.

The sensor 120 measuring a brake pedal force/speed/distance is connected to the operating data acquisition module 125.

The operating data acquisition module 125 is connected to the sensor 120 measuring a brake pedal force/speed/distance and the operating data accumulation module 135.

The external environment data classification module 130 is connected to the external environment data acquisition module 115, the operating data accumulation module 135, and the operation amount calculation module 265.

The operating data accumulation module 135 is connected to the external environment data acquisition module 115, the operating data acquisition module 125, the external environment data classification module 130, and the operating data DB 140.

The operating data DB 140 is connected to the operating data accumulation module 135, the operation model construction module 155, and the operation amount calculation module 265.

The vehicle body data DB 145 is connected to the operation model construction module 155 and the operation amount calculation module 265.

The maintenance data DB 150 is connected to the operation model construction module 155 and the operation amount calculation module 265.

The operation model construction module 155 is connected to the operating data DB 140, the vehicle body data DB 145, the maintenance data DB 150, and the operation model storage module 160.

The operation model storage module 160 is connected to the operation model construction module 155 and the operation amount calculation module 265.

The operation amount calculation module 265 is connected to the external environment data acquisition module 115, the external environment data classification module 130, the operating data DB 140, the vehicle body data DB 145, the maintenance data DB 150, the operation model storage module 160, and the control module 270.

The control module 270 is connected to the operation amount calculation module 265.

Figure 4:
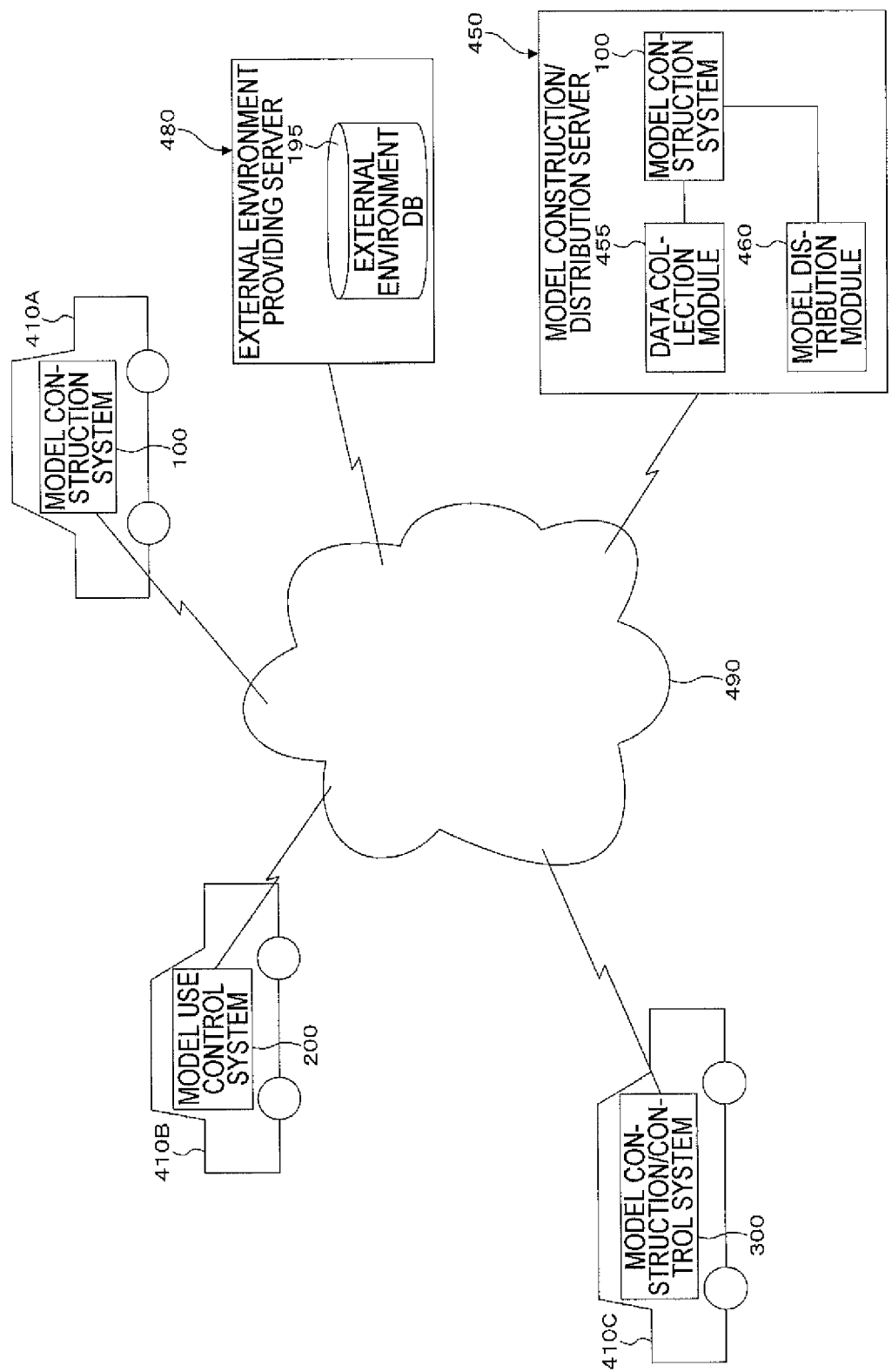
FIG. 4 is a view for explaining an exemplary system configuration using the exemplary embodiment.

FIG. 4 is a view for explaining an exemplary system configuration using the present exemplary embodiment.

A model construction system 100 of an automatic driving vehicle 410A, a model use control system 200 of an automatic driving vehicle 410B, a model construction/control system. 300 of an automatic driving vehicle 410C, a model construction/distribution server 450, and an external environment providing server 480 are connected to each other through a communication line 490. The communication between the communication line 490 and the automatic driving vehicle 410 is a wireless communication. However, the communication line 490 may be a wireless communication line, a wired communication line, or a combination thereof, and may be, for example, the Internet as a communication infrastructure. In addition, the function by the model construction/distribution server 450 and the external environment providing server 480 may be implemented as a cloud service.

The automatic driving vehicle 410A includes the model construction system 100. The automatic driving vehicle 410B includes the model use control system 200. The automatic driving vehicle 410C includes the model construction/control system 300. The external environment providing server 480 includes the external environment DB 195.

The model construction/distribution server 450 has the function equivalent to that of the model construction system 100 illustrated in the example of FIG. 1, and constructs operation models to distribute the operation models to each automatic driving vehicle 410. The model construction/ distribution server 450 includes a model construction system 100, a data collection module 455, and a model distribution module 460. Here, the model construction system 100 is connected to the data collection module 455 and the model distribution module 460. Of course, the position measuring device 105, the external environment sensor 110, the sensor 120 measuring a brake pedal force/speed/distance and others are unnecessary for the model construction system 100 within the model construction/distribution server 450.

The data collection module 455 is connected to the model construction system 100. The data collection module 455 collects data (specifically, the data acquired by the position measuring device 105, and the external environment sensor 110, the sensor 120 measuring a brake pedal force/speed/distance and others, and the data within the external environment DB 195) from each automatic driving vehicle 410.

The model distribution module 460 is connected to the model construction system 100. The model distribution module 460 distributes the operation models constructed by the model construction system 100 to each automatic driving vehicle 410.

Each automatic driving vehicle 410 controls, for example, traveling according to the operation models constructed by the automatic driving vehicle 410 itself or the operation models transmitted from other devices (the model construction system 100 and the model construction/distribution server 450 within the automatic driving vehicle 410A).

Figure 5:
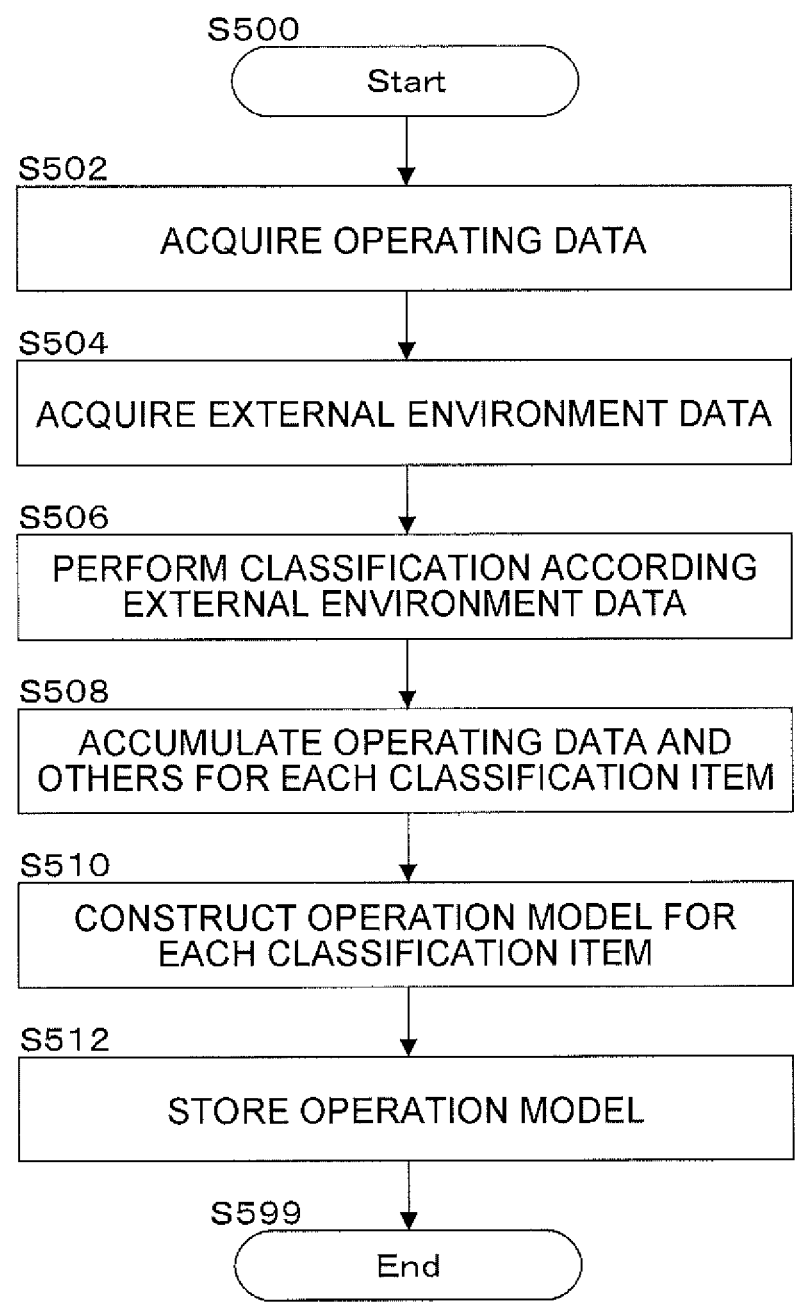
FIG. 5 is a flow chart illustrating an exemplary processing by the exemplary embodiment.

FIG. 5 is a flow chart illustrating an exemplary processing by the present exemplary embodiment.

In step S502, the operating data acquisition module 125 acquires operating data of the automatic driving vehicle 410 from the sensor 120 measuring a brake pedal force/speed/distance and others.

In step S504, the external environment data acquisition module 115 acquires external environment data from the position measuring device 105, the external environment sensor 110, and the external environment DB 195.

Figure 6:
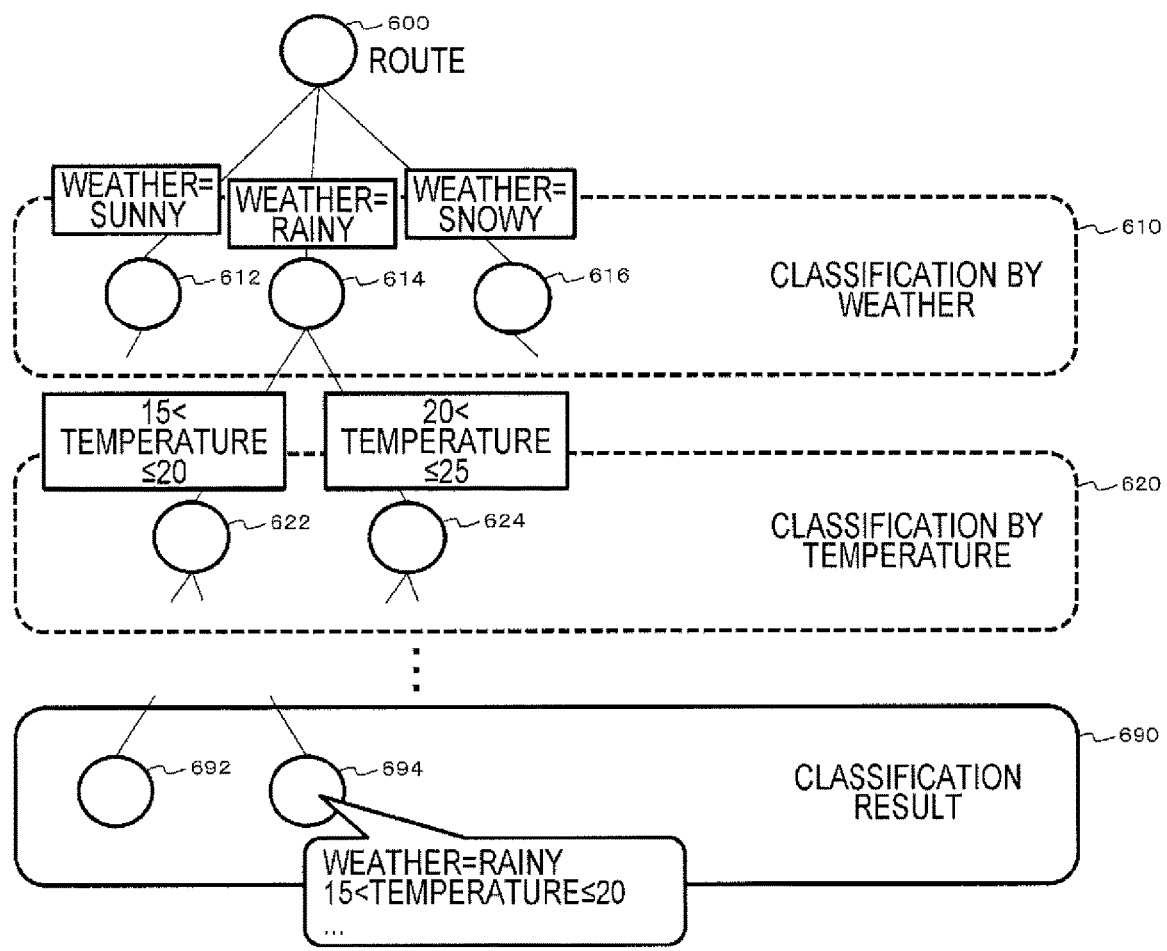
FIG. 6 is a view for explaining an exemplary processing by an exemplary embodiment.

In step S506, the external environment data classification module 130 performs a classification according to the external environment data. The classification will be described by using the specific example illustrated in FIG. 6. FIG. 6 is a view for explaining an exemplary processing by the present exemplary embodiment. FIG. 6 represents an example of a classification by a tree-structure branching process (decision tree). Here, examples of the external environment data are weather, a temperature and others.

In a layer 610, the classification is performed according to weather (meteorological information). Specifically, a case of the condition "weather=sunny" is classified into a node 612, a case of the condition "weather=rainy" is classified into a node 614, and a case of the condition "weather=snowy" is classified into a node 616.

In a layer 620, the classification is performed according to a temperature. A case belonging to the node 614 and meeting the condition "15<temperature≤20" is classified into a node 622, and a case belonging to the node 614 and meeting the condition "20<temperature≤25" is classified into a node 624.

A layer 690 represents the classification result. For example, a node 694 representing the classification items includes "weather=rainy," "15<temperature≤20," . . . .

In step S508, the operating data accumulation module 135 accumulates operating data and others for each classification item in the operating data DB 140.

In step S510, the operation model construction module 155 constructs an operation model for each classification item.

In step S512, the operation model storage module 160 stores the operation model.

Figure 11:
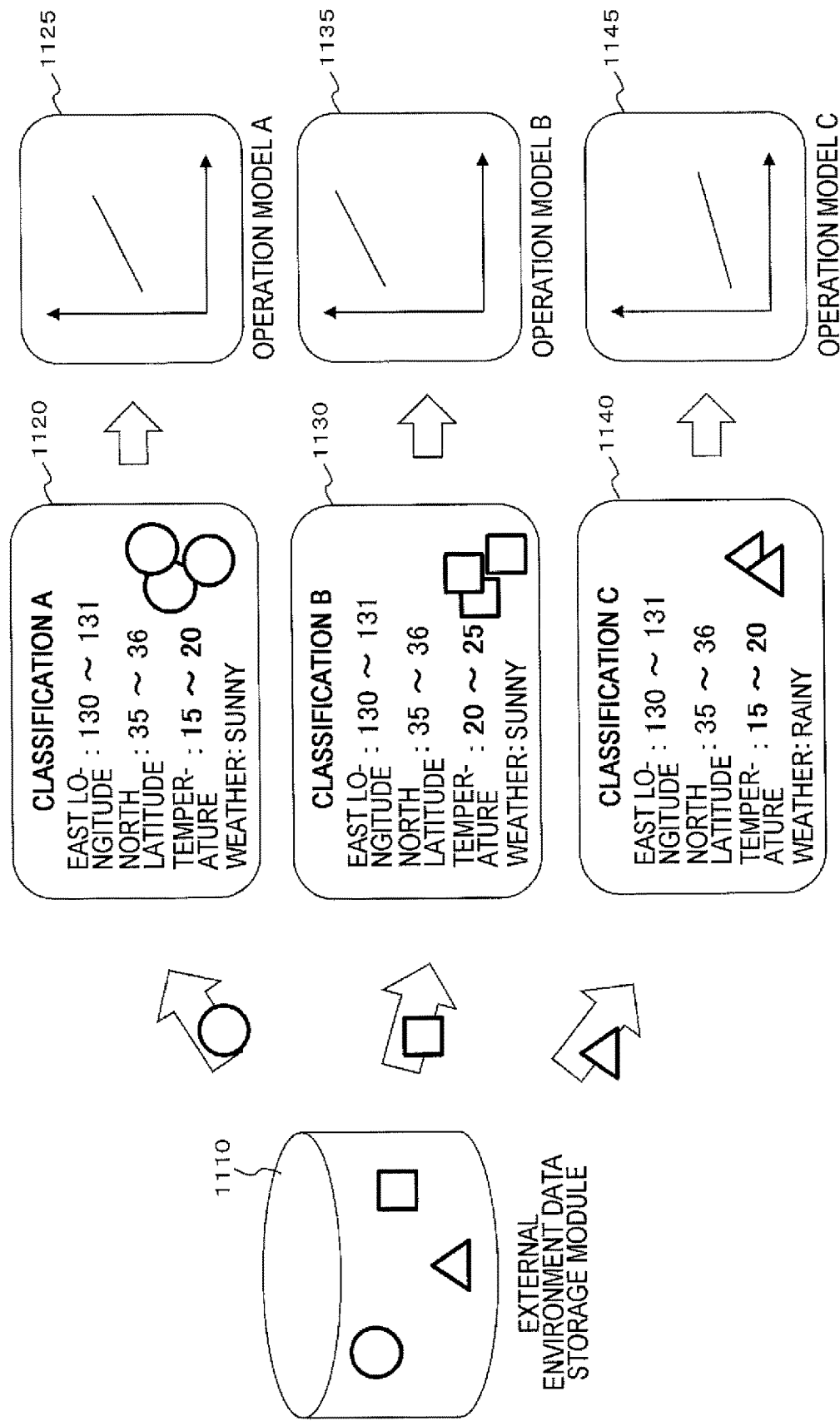
FIG. 11 is a view for explaining an exemplary processing by the exemplary embodiment.

FIG. 11 is a view for explaining an exemplary processing by the present exemplary embodiment (the processing of the flow chart illustrated in the example of FIG. 5).

An external environment data storage module 1110 stores external environment data (e.g., position data and weather data) acquired by the external environment data acquisition module 115.

A classification is performed according to the external environment data within the external environment data storage module 1110. For example, classification A 1120 is a classification item meeting the condition "East Longitude: 130-131, North Latitude: 35-36, Temperature: 15-20, and Weather: Sunny." Classification B 1130 is a classification item meeting the condition of "East Longitude: 130-131, North Latitude: 35-36, Temperature: 20-25, and Weather: Sunny." Classification C 1140 is a classification item meeting the condition of "East Longitude: 130-131, North Latitude: 35-36, Temperature: 15-20, and Weather: Rainy."

Then, an operation model is constructed by using the operating data corresponding to each of the classification items (classifications A 1120, B 1130, or C 1140). An operation model is constructed for each classification item. Specifically, operation model A 1125 corresponding to classification A 1120, operation model B 1135 corresponding to classification B 1130, and operation model C 1145 corresponding to classification C 1140 are constructed. In addition, the operation models may be constructed by further using the vehicle body data within the vehicle body data DB 145 and the maintenance data within the maintenance data DB 150, in addition to the operating data. Specifically, an operation model which anticipates an appropriate brake pedal force is constructed for each classification.

Figure 12:
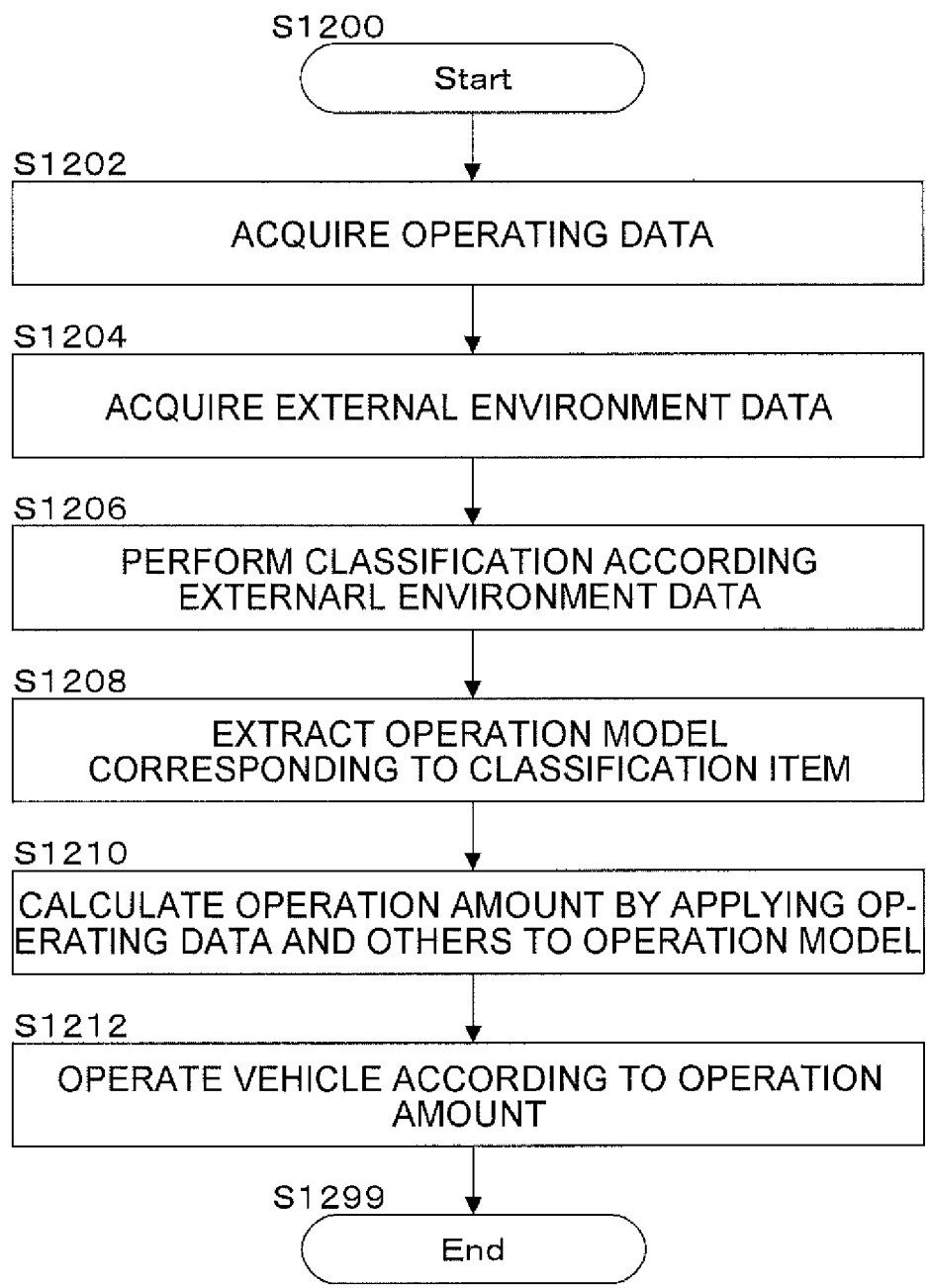
FIG. 12 is a flow chart illustrating an exemplary processing by the exemplary embodiment.

FIG. 12 is a flow chart illustrating an exemplary processing by the present exemplary embodiment (the model use control system 200). Here, operation models have already been constructed, and the traveling of the automatic driving vehicle 410 is controlled by using the operation models.

In step S1202, the operating data acquisition module 125 acquires operating data.

In step S1204, the external environment data acquisition module 115 acquires external environment data.

In step S1206, the external environment data classification module 130 performs a classification according to the external environment data.

In step S1208, the operation amount calculation module 265 extracts operation models corresponding to classification items.

In step S1210, the operation amount calculation module 265 calculates an operation amount by applying the operating data and others to the operation models.

In step S1212, the control module 270 operates the vehicle according to the operation amount.

FIG. 13 is a view illustrating an exemplary data structure of a time-series classification table 1300. Descriptions will be made on a case where operation models are constructed by using past environment data. The external environment data acquisition module 115 prepares the time-series classification table 1300. Specifically, the external environment data acquired by the external environment data acquisition module 115 are stored as a history so that after lapse of X hour (s), the acquired external environment data become the external environment data acquired X hour(s) ago.

The time-series classification table 1300 includes a classification ID column 1310, a time-series weather column 1320, a time-series temperature column 1330, a time-series position column 1340 and others. The time-series weather column 1320 includes a current column 1322, a 12 hours ago column 1324, and a 24 hours ago column 1326. The time-series temperature column 1330 includes a current column 1332, a 3 hours ago column 1334, and a 6 hours ago column 1336. The time-series position column 1340 includes a current column 1342, a 1 hour ago column 1344, and a 2 hours ago column 1346. The time-series classification table 1300 is extended from the classification table 700 illustrated in the example of FIG. 7 to incorporate time-series external environments.

The classification ID column 1310 stores classification ID. The time-series weather column 1320 stores time-series weather to be classified into the classification ID. The current column 1322 stores current weather. The 12 hours ago column 1324 stores weather 12 hours ago. The 24 hours ago column 1326 stores weather 24 hours ago. The time-series temperature column 1330 stores a time-series temperature to be classified into the classification ID. The current column 1332 stores a current temperature. The 3 hours ago column 1334 stores a temperature 3 hours ago. The 6 hours ago column 1336 stores a temperature 6 hours ago. The time-series position column 1340 stores a time-series position to be classified into the classification ID. The current column 1342 stores a current position. The 1 hour ago column 1344 stores a position 1 hour ago. The 2 hours ago column 1346 stores a position 2 hours ago.

In addition, a time-series classification table having a data structure equivalent to that of the time-series classification table 1300 (specifically, having anticipated future external environment data columns) may be generated by acquiring external environment data (weather forecast data) anticipated by the external environment providing server 480.

Accordingly, the external environment data classification module 130 performs a classification by using past or future time-series external environment data, and the operation model construction module 155 constructs an operation model for each classification. Therefore, the automatic driving vehicle 410 may be controlled according to an operation model appropriate for an external environment having a time period. Specifically, in a case where the current weather is "sunny," and the weather of the previous day is "snowy," the control according to the external environment may be favorably performed, as compared to an operation model for a case where the current weather is simply "sunny."

Figure 14:
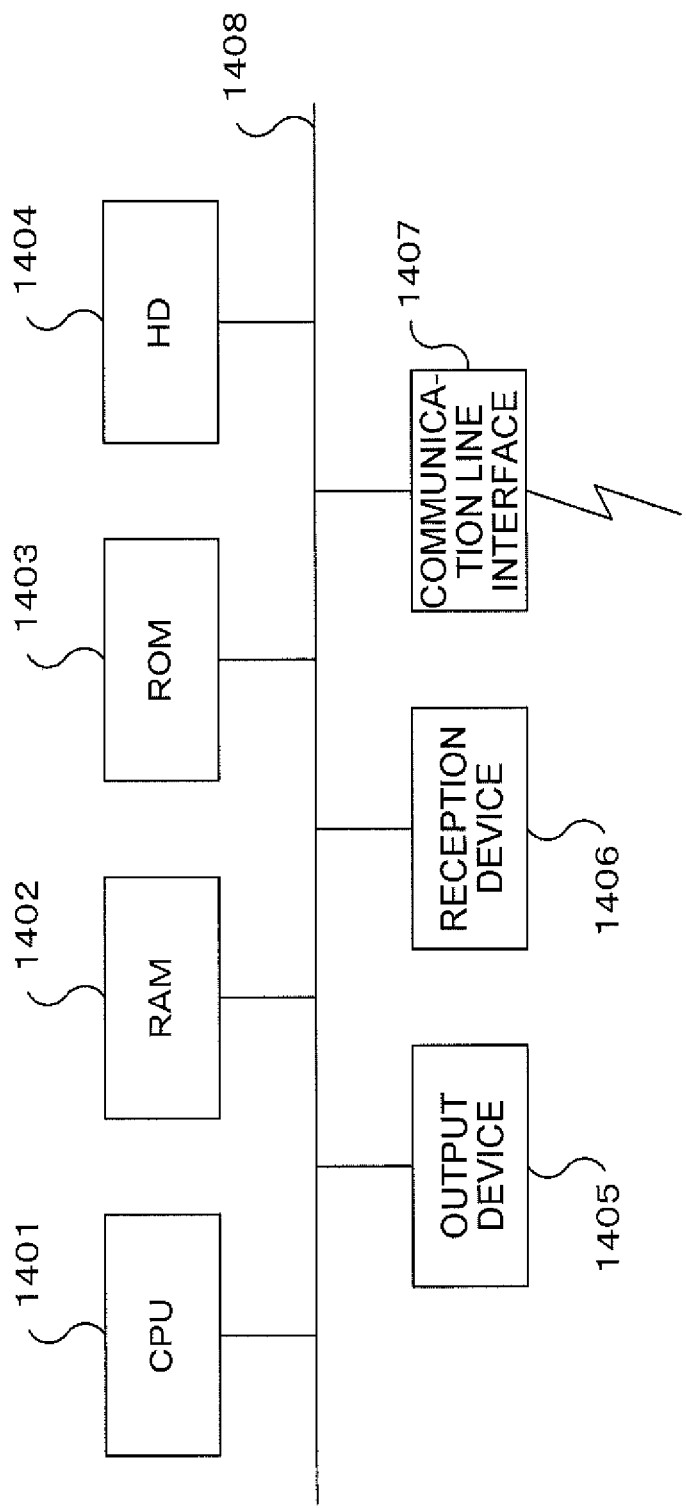
FIG. 14 is a block diagram illustrating an exemplary hardware configuration of a computer to implement the exemplary embodiment.

In addition, the hardware configuration of the computers in which the programs as the present exemplary embodiment are executed is general computers as illustrated in FIG. 14, and specifically, embedded computers (also called a control computer, e.g., an electronic/engine control unit (ECU)), computers serving as servers, or the like. That is, as a specific example, a CPU 1401 is used as a processor (arithmetic unit), a RAM 1402, a ROM 1403, and an HD 1404 are used as storage devices. As for HD 1404, for example, a hard disk or a solid state drive (SSD) may be used. The hardware configuration includes the CPU 1401 which executes the programs such as the external environment data acquisition module 115, the operating data acquisition module 125, the external environment data classification module 130, the operating data accumulation module 135, the operation model construction module 155, the operation amount calculation module 265, and the control module 270, the RAM 1402 which stores the programs or data, the ROM 1403 which stores a program to start the computer and others, the HD 1404 which is an auxiliary storage device (that may be, for example, a flash memory) having the functions of the operating data DB 140, the vehicle body data DB 145, the maintenance data DB 150, and the operation model storage module 160, an reception device 1406 which receives data based on a user's operation of a touch screen, a microphone, a keyboard, a mouse or the like or data from the position measuring device 105, the external environment sensor 110, the sensor 120 measuring a brake pedal force/speed/distance and others, an output device 1405 which outputs control data to a liquid crystal display, a loudspeaker, or each part within the automatic driving vehicle 410 by the processing of the control module 270, a communication line interface 1407 for connection to a communication network, such as a network interface card, and a bus 1408 which connects the above-described components to each other for exchange of data. These computers may be connected to each other by plural interconnection networks.

Among the above-described exemplary embodiments, the exemplary embodiments relating to computer programs are implemented by causing the computer programs as software to be read into the present hardware configuration system, and causing the software and the hardware resources to cooperate with each other. For example, the computer programs may be equipped on the operation system (OS) for a vehicle control, or inside the vehicle control OS.

In addition, the hardware configuration illustrated in FIG. 14 is an exemplary configuration. The exemplary embodiments of the present invention are not limited to the configuration illustrated in FIG. 14, and may have any configuration that enables the execution of the modules described in the exemplary embodiments of the present invention. For example, a portion of the modules may be configured as dedicated hardware (e.g., an application specific integrated circuit (ASIC) for a specific use), and a portion of the modules may be provided within an external system and connected to the other modules through a communication line. In addition, the systems illustrated in FIG. 14 may be connected to each other by plural interconnection communication lines to operate in cooperation with each other.

In addition, the above-described programs may be provided by being stored in a recording medium or the programs may be provided by a communication unit. In this case, for example, the above-described program may be construed as an invention of a "computer readable recording medium recording a program."

The "computer readable recording medium storing a program" indicates a computer readable recording medium storing a program, which is useful for installation, execution, distribution and others of a program.

In addition, the recording medium is, for example, a digital versatile disc (DVD) such as "DVD-R, DVD-RW, and DVD-RAM" which are formats defined in the DVD forum, and "DVD+R and DVD+RW" which are formats defined for DVD+RW, a compact disc (CD) such as a CD read only memory (CD-ROM), a CD recordable (CD-R), and a CD rewritable (CD-RW), a Blu-ray® disc, a magneto-optical (MO) disc, a flexible disc (FD), a magnetic tape, a hard disc, a read-only memory (ROM), an electrically erasable and programmable read-only memory (EEPROM®), a flash memory, a random access memory (RAM), and a secure digital (SD) memory card.

In addition, all or some of the above-described programs may be saved or distributed by being recorded in the recording medium. The programs may be caused to be transmitted by a communication using a transmission medium such as a wired network, a wireless communication network, or a combination thereof used for a local area network (LAN), a metropolitan area network (MAN), a wide area network (WAN), the Internet, the Intranet and others. In addition, the programs may be carried by carrier waves.

Furthermore, the above-described programs may be some or the entirety of other programs, or may be recorded together with separate programs in a recording medium. In addition, the programs may be divided and recorded in plural recording media. In addition, the programs may be recorded in any form, such as compression or encryption, as long as the programs in that form may be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An automatic moving object comprising:
a processor programmed to:
while the automatic moving object is moving:
obtain, from a sensor, operating data and external environment data of the automatic moving object;
construct, by the automatic moving object, a plurality of operation models corresponding to a plurality of different classes of at least one of the operating data and the external environment data; and
control automatic movement of the automatic moving object based on the constructed plurality of operation models.

2. The automatic moving object according to claim 1, wherein:
the sensor includes an external environment sensor and an operating condition sensor;
the external environment sensor includes at least one of a position sensor, a thermometer, a hygrometer, a barometer, a rain gauge, an anemometer, and a distance meter; and
the operating condition sensor measures at least one of a brake pedal force, a speed, a traveling distance, a number of engine revolutions, a gear position, an accelerator opening angle, a steering angle, and a traveling direction.

3. The automatic moving object according to claim 1, wherein the automatic moving object is one selected from the group consisting of an automobile, a two-wheeled vehicle, a trolley, a ship, a plane, a helicopter, a drone, and a wheel chair.

4. The automatic moving object according to claim 1, wherein the controlling the automatic movement includes calculating a brake pedal force of the automatic moving object based on the constructed plurality of operation models.

5. The automatic moving object according to claim 1, wherein the external environment data of the automatic moving object includes past external environment data including at least one of past position data of the automatic moving object and past meteorological data.

6. An automatic moving object comprising:
a processor programmed to:
while the automatic moving object is moving:
obtain, from a sensor, operating data and external environment data of the automatic moving object;
construct, by the automatic moving object, a plurality of operation models corresponding to a plurality of different classes of at least one of the operating data and the external environment data; and
transmit the constructed plurality of operation models to another automatic moving object so that automatic movement of the other automatic moving object is controlled based on the transmitted plurality of operation models.

7. The automatic moving object according to claim 6, wherein:
the sensor includes an external environment sensor and an operating condition sensor;
the external environment sensor includes at least one of a position sensor, a thermometer, a hygrometer, a barometer, a rain gauge, an anemometer, and a distance meter; and
the operating condition sensor measures at least one of a brake pedal force, a speed, a traveling distance, a number of engine revolutions, a gear position, an accelerator opening angle, a steering angle, and a traveling direction.

8. The automatic moving object according to claim 6, wherein:
the automatic moving object is one selected from the group consisting of an automobile, a two-wheeled vehicle, a trolley, a ship, a plane, a helicopter, a drone, and a wheel chair; and
the other automatic moving object is also one selected from the group.

9. The automatic moving object according to claim 6, wherein the external environment data of the automatic moving object includes past external environment data including at least one of past position data of the automatic moving object and past meteorological data.

10. An automatic moving object comprising:
a processor programmed to:
receive a plurality of operation models from another automatic moving object, the plurality of operation models (i) being constructed while the other automatic moving object is moving and (ii) corresponding to a plurality of different classes of at least one of operating data and external environment data of the other automatic moving object; and
control automatic movement of the automatic moving object based on the received plurality of operation models.

11. The automatic moving object according to claim 10, wherein:
the automatic moving object is one selected from the group consisting of an automobile, a two-wheeled vehicle, a trolley, a ship, a plane, a helicopter, a drone, and a wheel chair; and
the other automatic moving object is also one selected from the group.

12. The automatic moving object according to claim 10, wherein the controlling the automatic movement includes calculating a brake pedal force of the automatic moving object based on the received plurality of operation models.

13. The automatic moving object according to claim 10, wherein the external environment data of the other automatic moving object includes past external environment data including at least one of past position data of the other automatic moving object and past meteorological data.

* * * * *